United States Patent
Tanaka (10) Patent No.: US 7,477,295 B2
(45) Date of Patent: Jan. 13, 2009

(54) SYSTEM AND METHOD OF PHOTOGRAPHY USING DIGITAL CAMERA CAPABLE OF DETECTING INFORMATION ON A PHOTOGRAPHED SITE

(75) Inventor: Hiroshi Tanaka, Saitama (JP)

(73) Assignee: Fujifilm Corporation, Tokyo (JP)

( * ) Notice: Subject to any disclaimer, the term of this patent is extended or adjusted under 35 U.S.C. 154(b) by 836 days.

(21) Appl. No.: 10/796,053

(22) Filed: Mar. 10, 2004

(65) Prior Publication Data

US 2004/0189813 A1 Sep. 30, 2004

(30) Foreign Application Priority Data

Mar. 27, 2003 (JP) .............. 2003-087506

(51) Int. Cl.
*H04N 5/76* (2006.01)
*H04N 5/225* (2006.01)
*G03B 7/00* (2006.01)

(52) U.S. Cl. .............. 348/231.3; 348/207.99; 396/50

(58) Field of Classification Search .......... 348/231.3, 348/231.99, 113, 116; 396/50
See application file for complete search history.

(56) References Cited

U.S. PATENT DOCUMENTS 5,262,867 A * 11/1993 Kojima ............ 348/39
5,267,042 A * 11/1993 Tsuchiya et al. ........... 348/239
5,884,199 A * 3/1999 Maki ................ 455/575.1
5,913,078 A 6/1999 Kimura et al.
6,282,362 B1 * 8/2001 Murphy et al. ............. 386/46
2001/0055373 A1 12/2001 Yamashita
2002/0113879 A1 * 8/2002 Battle et al. ............. 348/207.2

FOREIGN PATENT DOCUMENTS

| JP | 7-64169 A | 3/1995 |
| JP | 9-37203 A | 2/1997 |
| JP | 11-46346 A | 2/1999 |

* cited by examiner

Primary Examiner—Luong T Nguyen
(74) Attorney, Agent, or Firm—Birch, Stewart, Kolasch & Birch, LLP (57) ABSTRACT

A GPS module of an object position detecting unit receives object position coordinate data from a GPS satellite via a GPS antenna. A radio I/F transmits object position coordinate data to a digital camera. After photographing an object, a CPU calculates camera azimuth and a distance between a photographed site and the object according to digital camera position coordinate data and the object position coordinate data. Thereafter, information on the digital camera position coordinate data, the object position coordinate data, the camera azimuth, and the distance between the photographed site and the object, is attached to tag information of an image file along with taken image and a thumbnail image, and recorded in a memory card.

12 Claims, 6 Drawing Sheets

| TAG INFORMATION | |
|---|---|
| TIME: 2003 FEBRUARY 14TH 11:27:53 | |
| MODE: NORMAL | |
| TITLE: "O× BRIDGE" | |
| WHITE BALANCE: AUTO | |
| FOCUS: MANUAL | |
| FLASH: OFF | |
| OBJECT:N35° 40′ 81″ /E135° 15′ 08.51″ | |
| CAMERA:N35° 40′ 20.50″ /E135° 15′ 08.20″ | |
| AZIMUTH: 45° | |
| DISTANCE: 150m | |
| ⋮ | |
| THUMBNAIL IMAGE (160×120) |  |
| MAIN IMAGE (1280×960) | |

FIG.7

SYSTEM AND METHOD OF PHOTOGRAPHY USING DIGITAL CAMERA CAPABLE OF DETECTING INFORMATION ON A PHOTOGRAPHED SITE

This Nonprovisional application claims priority under 35 U.S.C. § 119(a) on Patent Application No(s). 2003-087506 filed in JAPAN on Mar. 27, 2003, the entire contents of which are hereby incorporated by reference.

BACKGROUND OF THE INVENTION

1. Field of the Invention

The present invention relates to a system and a method of photography using a digital camera capable of detecting information on a photographed site.

2. Background Arts

Recently, digital camera users, who edit taken images and upload the edited images on homepages, or create digital albums, are increasing along with the widespread use of the digital cameras. It is convenient if information on photographed sites can be recorded in association with the taken images when there are a large number of images which are taken, for instance, during a trip.

In order to meet the above-mentioned request, a camera, which records and displays position coordinates of the photographed site in association with the image data, is suggested (See Japanese Patent Laid-Open Publication No. 7-64169, U.S. Pat. No. 5,913,078, Japanese Patent Laid-Open Publication No. 9-37203, and Japanese Patent Laid-Open Publication No. 11-46346). The above references disclose a camera incorporating GPS (Global Positioning System) function which is utilized for a car navigation device or a cellular phone. Further, a camera disclosed in U.S. Pat. No. 5,913,078 incorporates a gyroscope, which measures traveled distance and azimuth, to record camera azimuth in addition to the position coordinates of the photographed site.

An information processing system disclosed in USP No. 2001/0055373 transmits the position coordinates acquired by the car navigation device, and the images taken by the digital camera via a radio I/F bi-directionally. The taken image is displayed on a map of the car navigation device in association with the acquired position coordinates. Alternatively, information on the position coordinates acquired by the car navigation device can be recorded in the digital camera in association with the taken image by transmitting the information on position coordinates to the digital camera.

The digital camera can also be used for commercial use such as taking images of structures under construction. Images of a very large structure such as a bridge are often taken from a distance. In that case, it is convenient if a distance between the photographed site and the object can be obtained in addition to the object position and the camera azimuth. However, conventional methods can only detect one of the positions of the object and the photographed site. Therefore, the distance between the photographed site and the object cannot be obtained.

SUMMARY OF THE INVENTION

An object of the present invention is to provide a system and a method of photography which can obtain a distance between a photographed site and an object.

To achieve the above objects, the system and the method of photography of the present invention uses a digital camera and a position detecting unit.

The position detecting unit includes a first detecting device and a transmitting device, and is disposed close to the object. The first position detecting device detects latitude and longitude coordinates of the object, and generates an object position data from information on the latitude and longitude coordinates of the object. The transmitting device transmits the object position data to the digital camera.

The digital camera includes an image pickup device, a receiving device, and a second position detecting device. The image pickup device takes an image of the object and outputs image data. The receiving device receives the object position data. The second position detecting device detects latitude and longitude coordinates of the digital camera and generates camera position data from the information on the latitude and longitude coordinates of the digital camera.

Further, the digital camera includes a calculating means for calculating camera azimuth and object distance according to the object position data and the camera position data, and a recording means for recording information of at least one of the latitude and longitude coordinates of the object, the latitude and longitude coordinates of the digital camera, the camera azimuth and the object distance, in association with the image data.

The first and second position detecting devices includes GPS modules respectively. The transmitting device and the receiving device transmit/receive data via radio wave or a relay system. Further, the transmitting device and the receiving device are dielectric antennas.

At least one information on the latitude and longitude coordinates of the object, the latitude and longitude coordinates of the digital camera, the camera azimuth and the object distance, is recorded as tag information which constitutes an image file.

The position detecting unit further includes a main body, a radio antenna, a GPS module, and support members. The radio antenna is mounted to the main body, and has directivity for sending a radio signal. Furthermore, the main body works as a reflector. The support members support the main body in such a way that a distance between a bottom of the support member and the radio antenna is equal to or longer than one wavelength of the radio signal.

According to the present invention, the camera azimuth and the distance between a photographed site and the object can be calculated by acquiring both position coordinates: the photographed site and the object. Further, the above-mentioned data is recorded in association with the image, so that convenience of editing the images is improved.

BRIEF DESCRIPTION OF THE DRAWINGS

The above objects and advantages of the present invention will become apparent from the following detailed descriptions of the preferred embodiments when read in association with the accompanying drawings, which are given by way of illustration only and thus do not limit the present invention. In the drawings, the same reference numerals designate like or corresponding parts throughout the several views, and wherein.

DETAILED DESCRIPTION OF THE EMBODIMENTS

Figure 1:
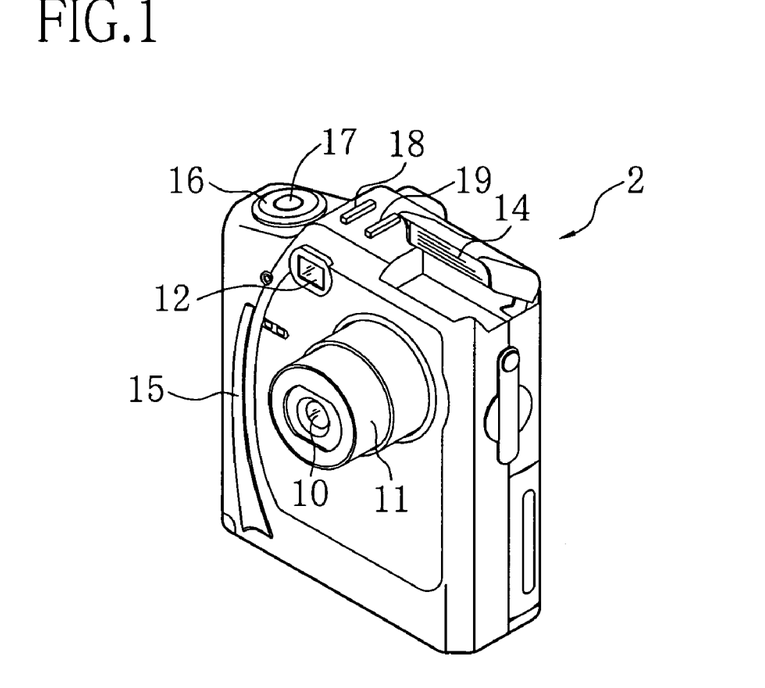
FIG. 1 is a front view of a perspective illustration of a digital camera.
Figure 2:
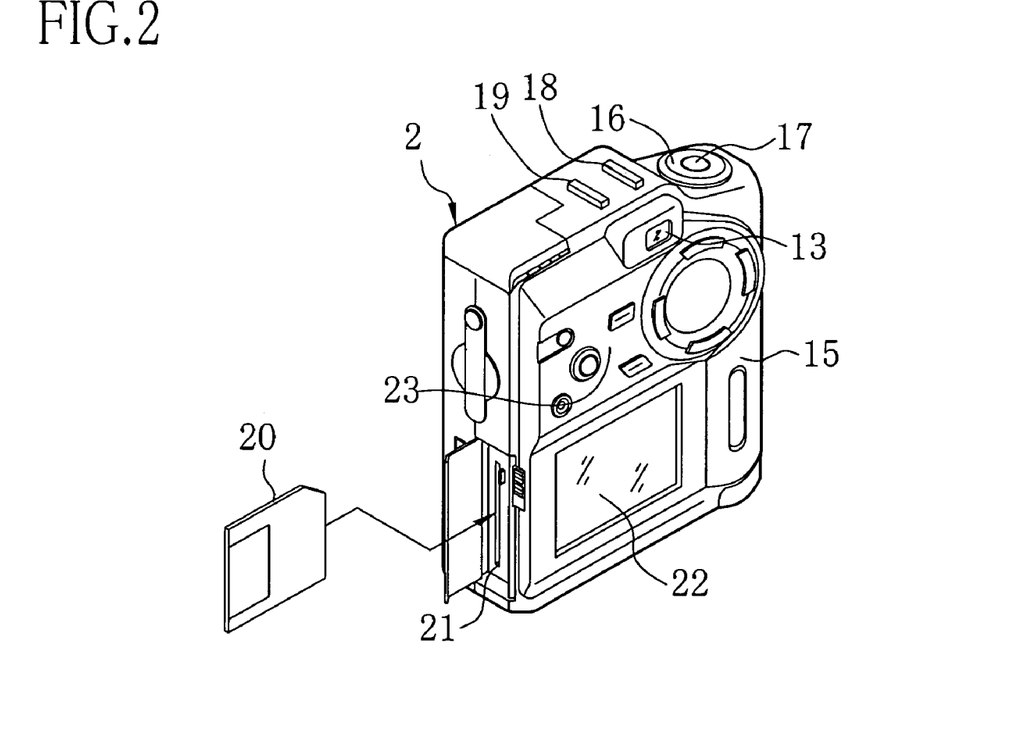
FIG. 2 is a rear view of the perspective illustration of the digital camera.

Referring to FIG. 1 and FIG. 2, a digital camera 2 is provided with a lens barrel 11 equipped with a taking lens 10, a viewfinder objective window 12 and a viewfinder eyepiece window 13, which constitute an optical viewfinder, and a flash emitting section 14. A grip 15, a mode selector dial 16, a release button 17, a GPS antenna 18, and a radio antenna 19 are provided on a side and an upper surface of the digital camera 2. A memory card slot 21, through which a memory card 20 is removably inserted, is provided on the other side of the digital camera 2.

Figure 3:
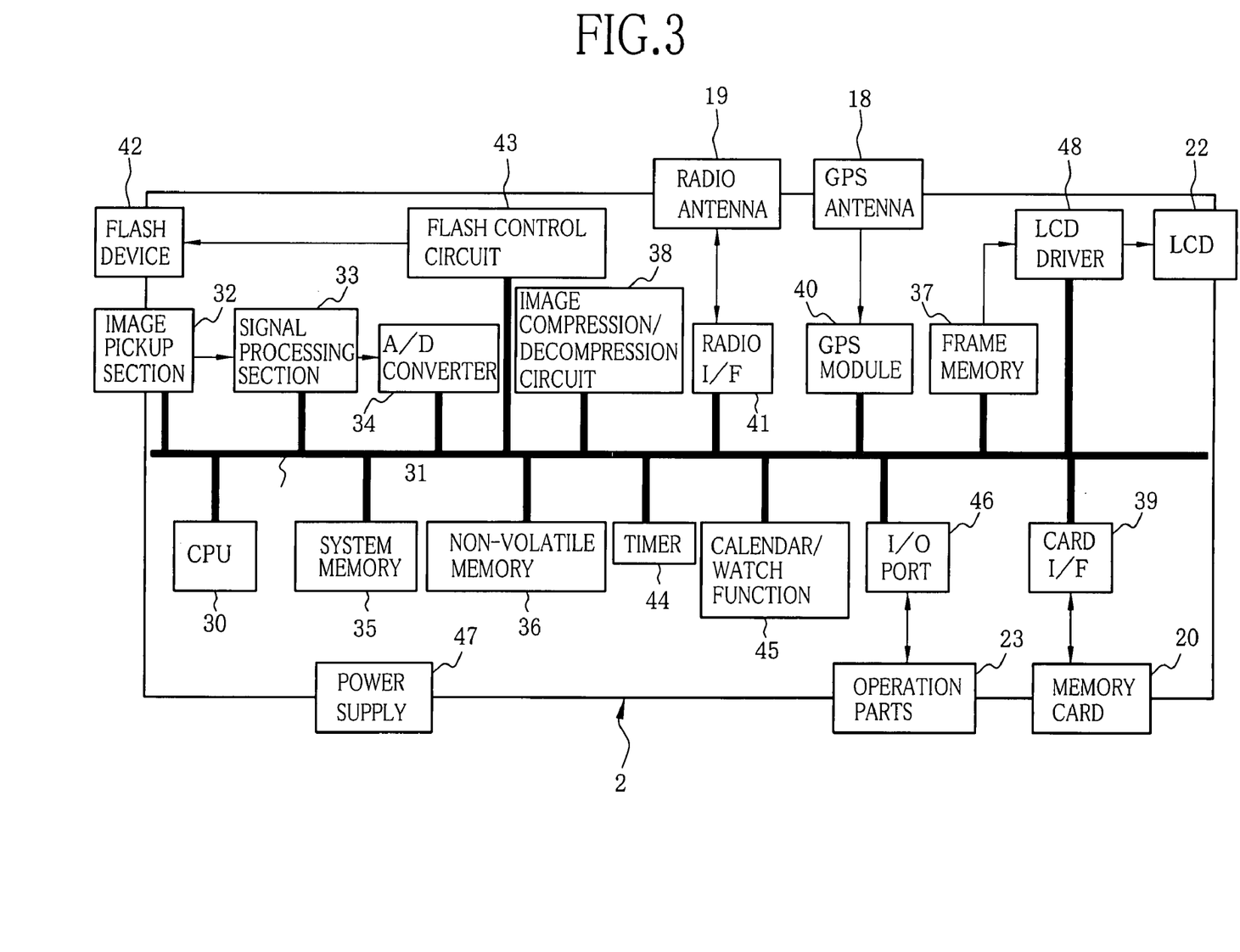
FIG. 3 is a block diagram showing an electrical configuration of the digital camera.

Referring to FIG. 3, an image pickup section 32 includes the taking lens 10, a CCD image sensor (not shown) disposed behind the taking lens 10, and the lens barrel 11. Image signals sent from the CCD image sensor are converted into digital image data by an A/D converter 34 (See FIG. 3). The image data is sent to a Liquid Crystal Display (LCD) 22 provided on the back of the digital camera 2, and displayed as so-called "through the lens image". Further, framing of an object image is decided via the LCD 22 or the optical viewfinder.

A release button 17 is pressed in two steps operation. After the framing via the LCD 22 or the optical viewfinder, the release button 17 is half-pressed to carry out various preparatory processes for an exposure, such as exposure correction, focus adjustment of the taking lens 10, and the like. The image signal data, which has been subject to preparatory processes for the exposure, is locked until the release button 17 is released. When the half-pressed release button 17 is fully pressed, the image signals of one frame is converted into image data, and recorded in the memory card 20 along with various position information which is described later.

Operation parts 23, which include a power supply switch, a zoom operation button and a cursor movement key, are provided on the back of the digital camera 2 in addition to the LCD 22. The power supply switch turns on/off the power supply. The zoom operation button moves the zoom lens of the taking lens 10 between telephoto and wide-angle. The cursor movement key moves a cursor on a menu displayed in the LCD 22.

The digital camera 2 has, for instance, the following selectable modes: a still image taking mode for taking still images, a moving image taking mode for taking moving images, a playback mode for displaying the taken images on the LCD 22 and a set up mode for setting up various settings. The mode is changed by rotating the mode selector dial 16.

Referring to FIG. 3, the CPU 30 controls each part of the digital camera 2 via a bus 31. The image pickup section 32 converts the optical object image taken by the taking lens 10 into electrical image signals through the CCD image sensor. The image signals sent from the image pickup section 32 are subject to various kinds of processing such as edge enhancement, gamma correction, white balance correction and the like, in a signal processing section 33. Thereafter, the image signals are converted into digital image data in the A/D converter 34.

A ROM, in which various programs for performing photographic sequence are recorded, or a RAM, in which various kinds of data necessary for executing the program is temporarily recorded, constitutes a system memory 35. The CPU 30 retrieves the program or the data recorded in the system memory 35 via the bus 31, and controls each part of the digital camera 2 according to the retrieved program or data.

A non-volatile memory 36 is constituted of rewritable recording medium such as EEPROM. Various kinds of set-up information necessary for operating the digital camera 2 are recorded in the non-volatile memory 36. For instance, when a new function is added to the digital camera 2, contents in the non-volatile memory 36 are rewritten to add new set-up information. The image data of one frame, which has been subject to image processing, is written into a frame memory 37, and saved until the next exposure.

An image compression/decompression circuit 38 compresses the image data written in the frame memory 37 in, for instance, JPEG format. The compressed image data is recorded in the memory card 20 through the card I/F 39.

A GPS module 40 receives digital camera position coordinate data (latitude and longitude data of a photographed site) from a GPS satellite via the GPS antenna 18. The digital camera position coordinate data is transmitted from the GPS satellite at intervals of, for instance, one second. The digital camera position coordinate data received by the GPS module 40 is temporarily recorded in the non-volatile memory 36. In this way, the most recently acquired digital camera position coordinate data can be used as a substitute for the actual digital camera position coordinate data in case the GPS module 40 cannot acquire the digital camera position coordinate data from the GPS satellite due to photographic conditions. The digital camera position coordinate data can be temporarily recorded in the RAM of the system memory 35.

The GPS module 40 is activated upon turning on the power supply of the digital camera 2, and outputs insignificant data until the GPS satellite, which is necessary for acquiring the digital camera position coordinates, is detected. After the power supply is turned on, the CPU 30 determines whether the digital camera position coordinate data acquired by the GPS module 40 is significant. Other processes are suspended until the CPU 30 determines that the acquired digital camera position coordinate data is significant.

Radio I/F 41 transmits an access signal to an object position detecting unit 50 (see FIG. 4 and FIG. 5) via the radio antenna 19, and at the same time, receives the object position coordinate data acquired by the object position detecting unit 50. After the power supply of the digital camera 2 is turned on, and the CPU 30 determines that the digital camera position coordinate data acquired by the GPS module 40 is significant, the access signal is transmitted. A compact antenna such as dielectric antenna is used in order not to interfere with the photography.

A flash device control circuit 43 controls an operation of a flash device 42. In addition to the above-mentioned parts, the digital camera 2 has a timer 44, a calendar/watch function 45 for recording photography date/time, I/O port 46 for sending/receiving output/input signals to/from the operation parts 23, a power supply unit 47 for supplying power to each part, and an LCD driver 48 for controlling the drive of LCD 22.

Figure 4:
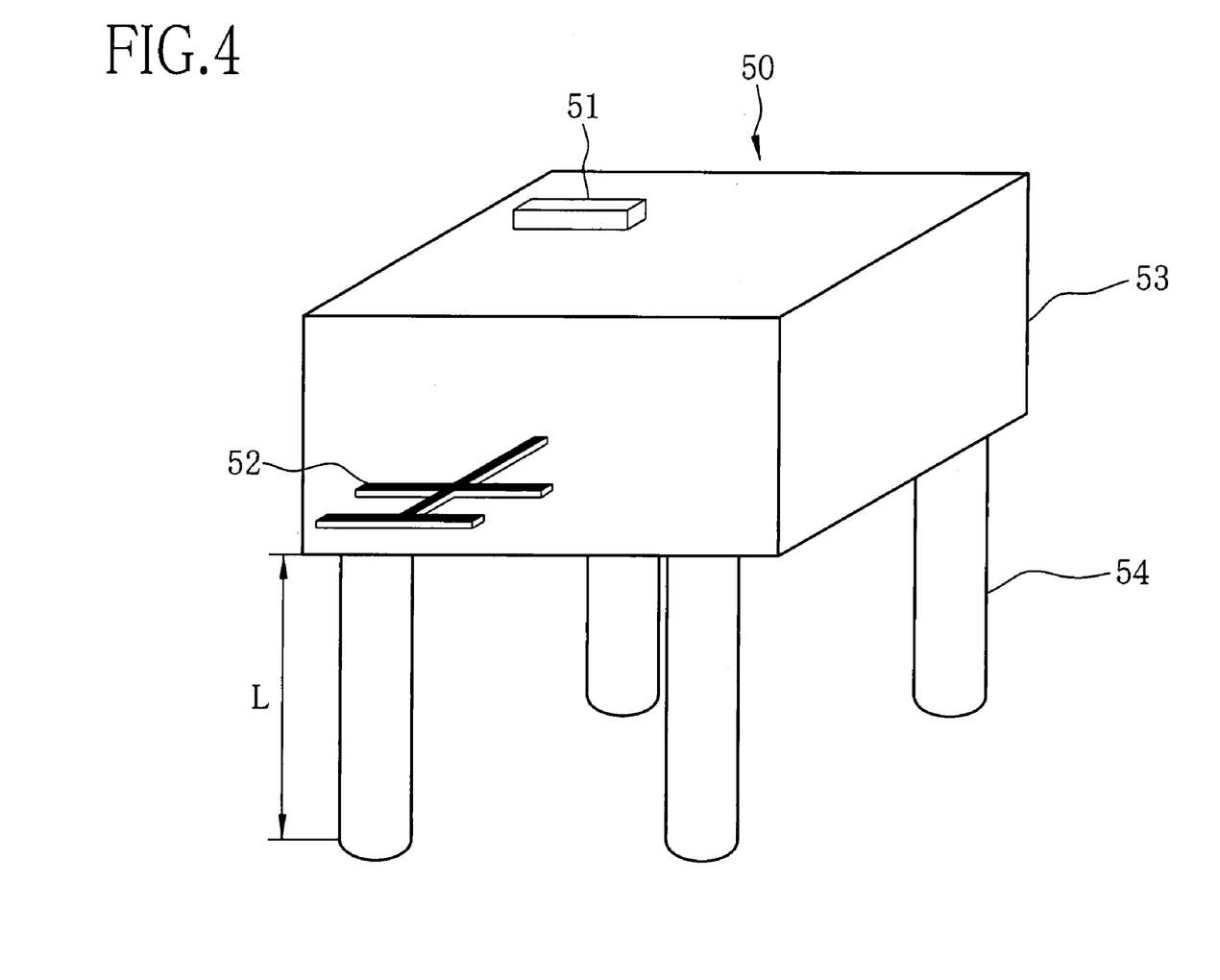
FIG. 4 is a perspective illustration of an object position detecting unit.

Referring to FIG.4, the object position detecting unit 50 includes a GPS antenna 51, a box-shaped main body 53 to which a radio antenna 52 is mounted, and four legs 54 for supporting the main body 53. The radio antenna 52 has directivity, and is mounted to the main body 53 such that the main body 53 works as a reflector. The object position detecting unit 50 is placed close to the object in the direction that the radio antenna 52 is approximately aimed at the digital camera 2.

A length L of a leg 54 is decided to set the distance between the bottom of a leg 54 and the radio antenna 52 equal to or longer than one wavelength of the radio signal, so that the distance between the radio antenna 52 and the ground is more than one wavelength of the radio signal. Thereby, the radio signal can be transmitted from the radio antenna 52 in a low launch angle. As a result, data-transmission distance can be extended.

Figure 5:
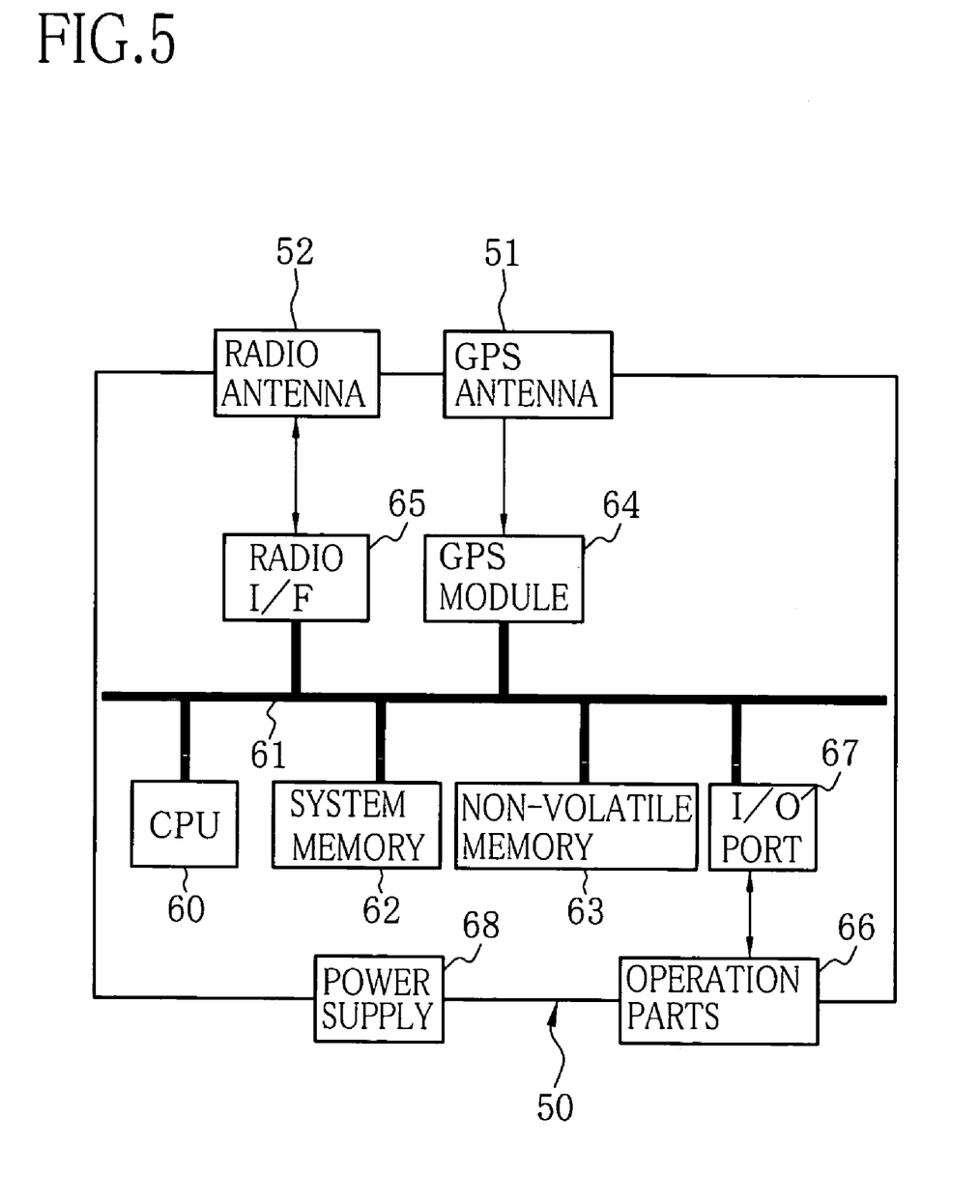
FIG. 5 is a block diagram showing an electrical configuration of the object position detecting unit.

Referring to FIG.5, A GPS module 64 of the object position detecting unit 50 receives the object position coordinate data (latitude and longitude data of the object) from the GPS satellite via the GPS antenna 51. The object position coordinate data received by the GPS module 64 is temporarily recorded in the non-volatile memory 63.

The GPS module 64 turns on upon turning on the object position detecting unit 50, and outputs insignificant data until the GPS satellite, which is necessary for acquiring the position coordinate data, is detected. The radio I/F 65 receives the access signal transmitted from the radio I/F 41 of the digital camera 2 via the radio antenna 52. At the same time, the object position coordinate data, which is temporarily recorded in the non-volatile memory 63, is transmitted to the digital camera 2. The object position coordinate data is transmitted to the radio I/F 41 after the access signal is received. The CPU 30 determines whether the transmitted object position coordinate data is significant. When the CPU 30 determines that the position coordinate data is significant, the digital camera 2 turns into a stand-by state.

An image is taken by pressing the release button 17 fully in a standby state. Thereafter, the CPU 30 retrieves the digital camera position coordinate data from the non-volatile memory 36. Then, the object position detecting unit 50 transmits the object position coordinate data, which is recorded in the non-volatile memory 63 at the time of photography, to the radio I/F 41.

The CPU 30 calculates the camera azimuth and the distance between the camera and the object according to the digital camera position coordinate data retrieved from the non-volatile memory 36, and the object position coordinate data sent from the object position detecting unit 50.

Figure 6:
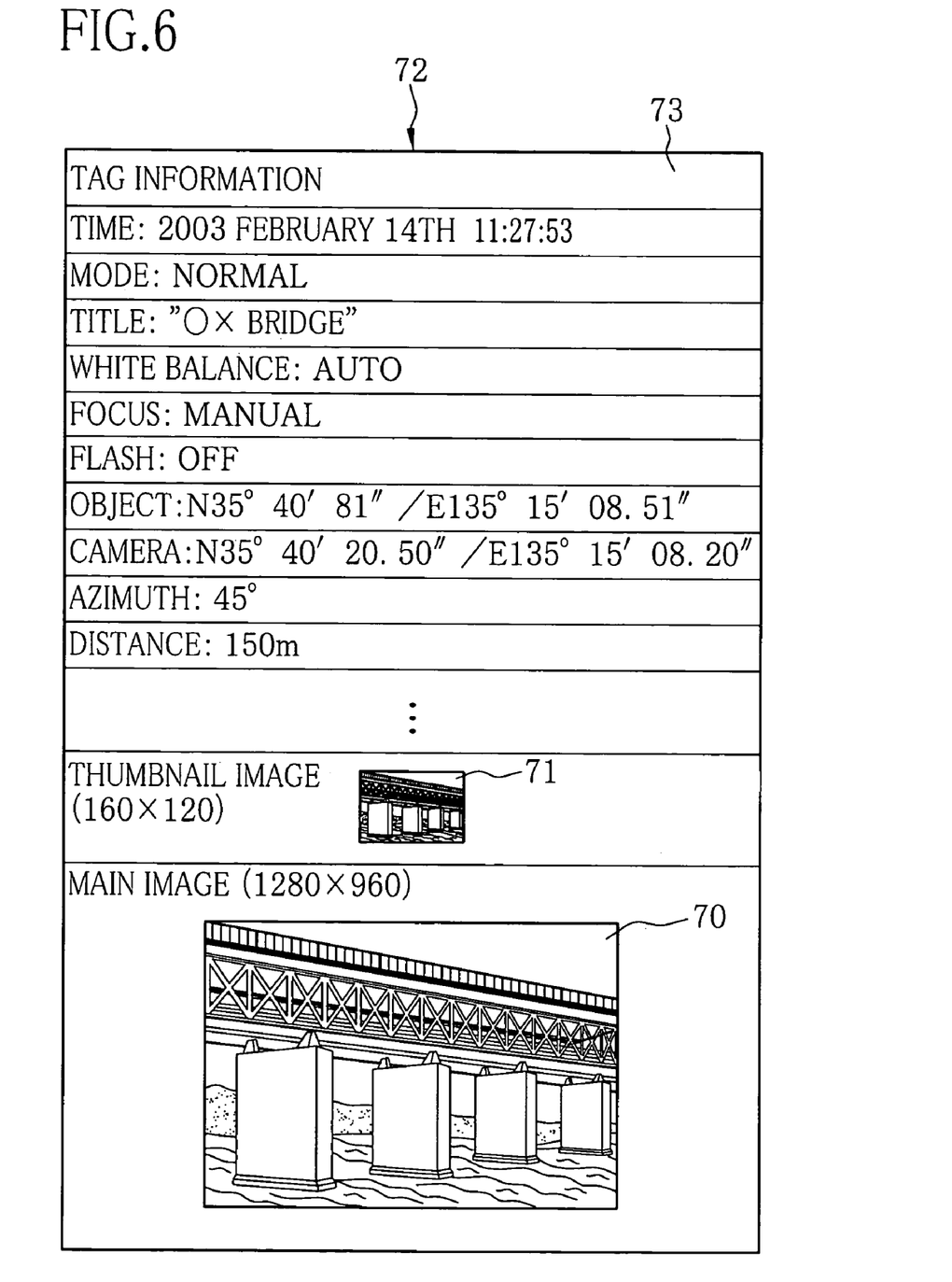
FIG. 6 is an explanatory view showing a layout of an image file.

Referring to FIG. 6, the CPU 30 attaches information on the position coordinates of the photographed site, the object position coordinates, the camera azimuth, and the distance between the photographed site and the object, to tag information 73 of an image file 72 along with a taken image 70 and a thumbnail image 71. Thereafter, the above-mentioned data is recorded in the memory card 20.

Figure 7:
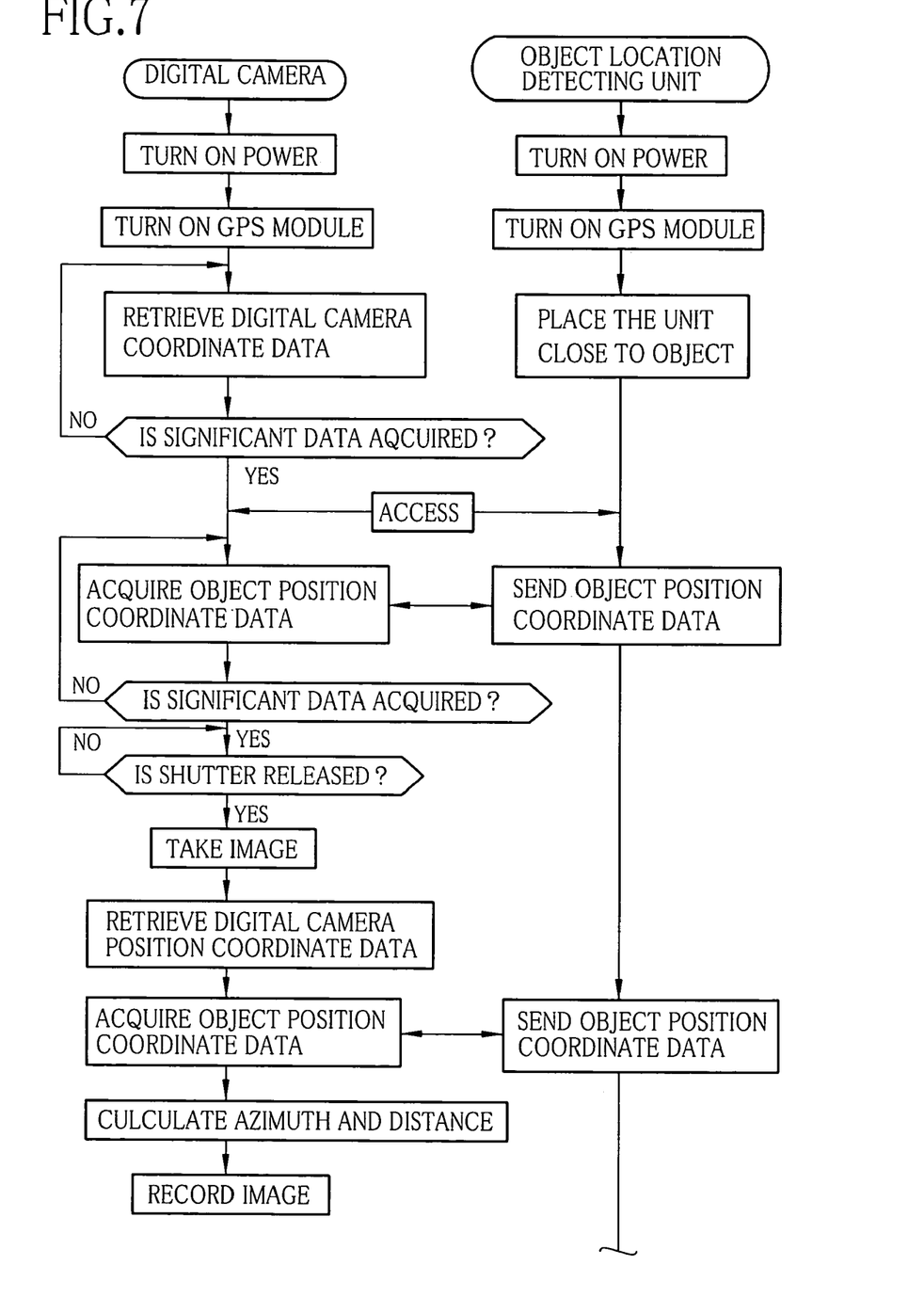
FIG. 7 is a flow chart showing each sequence of the digital camera and the object position detecting unit.

Referring to FIG.7, operations of the digital camera 2 and the object position detecting unit 50 are described. First, the power supplies of the digital camera 2 and the object position detecting unit 50 are turned on to turn on the GPS modules 40 and 64. Thereafter, the object position detecting unit 50 is placed close to the object. The position coordinate data of the digital camera 2 is retrieved from the non-volatile memory 36. Then, the CPU 30 determines whether the digital camera position coordinate data acquired by the GPS module 40 is significant.

When the GPS module 40 acquires the significant data, the radio I/F 41 of the digital camera 2 transmits the access signal to the radio I/F 65 of the object position detecting unit 50. Thereby, the digital camera 2 and the object position detecting unit 50 are connected by wireless access.

Thereafter, the object position coordinate data is transmitted from the object position detecting unit 50 to the digital camera 2. The CPU 30 of the digital camera 2 determines whether the transmitted object position coordinate data is significant.

After the significant object position coordinate data is transmitted from the object position detecting unit 50, the object image is taken by pressing the release button fully during the standby state. Thereafter, the digital camera position coordinate data is retrieved from the non-volatile memory 36, and the object position coordinate data is transmitted from the object position detecting unit 50 to the digital camera 2.

After the object position coordinate data is acquired, the CPU 30 calculates the camera azimuth and the distance between the photographed site and the object, according to the digital camera position coordinate data and the object position coordinate data. The information on the digital camera position coordinates, the object position coordinates, the camera azimuth, and the distance between the photographed site and the object, is attached to the tag information 73 of the image file 72 along with the taken image 70 and the thumbnail image 71, and recorded in the memory card 20. After the images are recorded, the camera returns to the standby state. According to the above-mentioned configuration, the digital camera position coordinate data can be acquired along with the object position coordinate data. As a result, convenience of image editing is improved.

In the above embodiment, the digital camera 2 and the object position detecting unit 50 are directly connected by the wireless access via the radio I/Fs 41 and 65. However, when digital camera 2 and the object position detecting unit are distant, the data transmission can be carried out by using a relay system, for instance, a cellular phone system.

Although the present invention has been described with respect to the preferred embodiment, the preset invention is not to be limited to the above embodiment but, on the contrary, various modifications will be possible to those skilled in the art without departing from the scope of claims appended hereto.

What is claimed is:

1. A photography system using a digital camera and a position detecting unit, said position detecting unit being disposed close to an object, said photography system comprising:
    a first position detecting device for detecting latitude and longitude coordinates of said object to generate object position data from information on said latitude and longitude coordinates of said object; and
    a transmitting device for transmitting said object position data to said digital camera,
    wherein said digital camera includes:
        an image pickup device for photographing said object and outputting image data;
        a receiving device for receiving said object position data;
        a second position detecting device for detecting latitude and longitude coordinates of said digital camera to generate digital camera position data from information on said latitude and longitude coordinates of said digital camera;
        a calculation processor for calculating camera azimuth and object distance according to said object position data and said digital camera position data; and
        a recording processor for recording information of at least one of said latitude and longitude coordinates of said object, said latitude and longitude coordinates of said digital camera, said camera azimuth and said object distance, in association with said image data.

2. A photography system as recited in claim 1, wherein said first position detecting device and said second position detecting device include GPS modules respectively.

3. A photography system as recited in claim 1, wherein said transmitting device and said receiving device transmit/receive data via radio waves or a relay system.

4. A photography system as recited in claim 1, wherein said transmitting device and said receiving device are dielectric antennas.

5. A photography system as recited in claim 1, at least one information on said latitude and longitude coordinates of said object, said latitude and longitude coordinates of said digital camera, said camera azimuth, and said object distance, is recorded as tag information which constitutes an image file.

6. A photography system as recited in claim 1, said position detecting unit comprising:
   a main body;
   a radio antenna having directivity for sending a radio signal, and being mounted to said main body, wherein said main body works as a reflector;
   a GPS module; and
   support members for supporting said main body in such a way that a distance between a bottom of said support members and said radio antenna is equal to or longer than one wavelength of said radio signal.

7. A photography method using a digital camera and a position detecting unit, said position detecting unit being disposed close to an object, said photography method comprising the steps of:
   detecting latitude and longitude coordinates of said object by first position detecting device provided in said position detecting unit, and generating object position data from information on said latitude and longitude coordinates of said object;
   transmitting said object position data from said position detecting unit to said digital camera;
   receiving said object position data by said digital camera;
   detecting latitude and longitude coordinates by second position detecting device provided in said digital camera, and generating digital camera position data from information on said latitude and longitude coordinates of said digital camera;
   calculating camera azimuth and object distance according to said object position data and said digital camera position data; and
   recording information of at least one of said latitude and longitude coordinates of said object, said latitude and longitude coordinates of said digital camera, said camera azimuth and said object distance, in association with object image data.

8. A photography method as claimed in claim 7, wherein said first position detecting device and said second position detecting device include GPS modules respectively.

9. A photography method as claimed in claim 7, wherein said transmitting device and said receiving device transmit/receive data via radio waves or a relay system.

10. A photography method as claimed in claim 7, wherein said digital camera and said position detecting unit includes dielectric antennas respectively.

11. A photography method as claimed in claim 7, wherein at least one information on said latitude and longitude coordinates of said object, said latitude and longitude coordinates of said digital camera, said camera azimuth, and said object distance, is recorded as tag information which constitutes an image file.

12. A photography method as claimed in claim 7, said position detecting unit comprising:
   a main body;
   a radio antenna having directivity for sending a radio signal, and being mounted to said main body, wherein said main body works as a reflector;
   a GPS module; and
   support members for supporting said main body in such a way that a distance between a bottom of said support members and said radio antenna is set to be equal to or longer than one wavelength of said radio signal.

* * * * *